US006088510A

United States Patent [19]
Sims

[11] Patent Number: 6,088,510
[45] Date of Patent: Jul. 11, 2000

[54] COMPUTER SYSTEM AND METHOD FOR GENERATING AND MUTATING OBJECTS BY ITERATIVE EVOLUTION

[75] Inventor: Karl P. Sims, Somerville, Mass.

[73] Assignee: Thinking Machines Corporation, Bedford, Mass.

[21] Appl. No.: 08/237,982

[22] Filed: May 2, 1994

Related U.S. Application Data

[63] Continuation of application No. 07/908,712, Jul. 2, 1992, abandoned.

[51] Int. Cl.[7] .................................................... G06F 15/18
[52] U.S. Cl. ................................................................ 395/13
[58] Field of Search ........................................ 395/13

[56] References Cited

U.S. PATENT DOCUMENTS

| | | | |
|---|---|---|---|
| 4,697,242 | 9/1987 | Holland et al. | 395/13 |
| 4,935,877 | 6/1990 | Koza | 395/13 |
| 4,961,152 | 10/1990 | Davis | 395/13 |
| 5,048,095 | 9/1991 | Bhanu et al. | 395/13 |
| 5,136,686 | 8/1992 | Koza | 395/13 |
| 5,148,513 | 9/1992 | Koza et al. | 395/13 |

OTHER PUBLICATIONS

Koza, John R., "Genetic Programming: A Paradigm for Genetically Breeding Populations Of Computer Programs To Solve Problems", Stanford University Department of Computer Science Report No. STAN–CS–90–1314 (Jun., 1990).

Towards the Evolution of Symbols; Dolan et al; Proc 2nd Inter Conf on Genetic Algorithms; Jul. 28–31, 1987; pp. 123–131.

A Genetic Algrithm for Massively Parallel Computers; Spiessens et al; Parallel Processing in Neural Systems and Computers; Elsivier Sci. Pub. 1990; pp. 31–36.

Using Genetic Algorithms to Select and Create Features for Pattern Classification; Chang et al; Inter. JT. Conf. on Neural Networks; Jun. 17–21, 1990; pp. III–747 to III–752.

On Using Genetic Algorithms to Search Program Spaces; De Jong; Proc. of 2nd Inter. Conf. on Genetic Algorithms; Jul. 28–31, 1987; pp. 210–216.

Using the Genetic Algorithm to Generate LISP Source Code to Solve the Prisoner's Dilemma; Fujiki et al; Proc. of 2nd Inter. Conf. on Genetic Algorithms; Jul. 28–31, 1987; pp. 236–240.

The Structured Rules in Genetic Algorithms; Bickel et al; Proc. of 2nd Inter. Conf. on Genetic Algorithms; Jul. 28–31, 1987; pp. 77–81.

*Primary Examiner*—Robert W. Downs
*Attorney, Agent, or Firm*—Richard A. Jordan

[57] ABSTRACT

A computer object processing system for, during selected iterations, generating an object, such as an expression defining an image. During an initial iteration, a predetermined number of seed objects are generated, each seed object defining an object for the initial iteration. During each successive iteration, a predetermined number of mutated objects are generated (i) in response to an operator selected one of the seed objects during the initial iteration and (ii) in response to a an operator selected object during each iteration after the initial iteration. During each iteration one of the seed objects or one of the mutated objects is selected for use in generating a mutated object during a subsequent iteration.

24 Claims, 3 Drawing Sheets

COMPUTER SYSTEM AND METHOD FOR GENERATING AND MUTATING OBJECTS BY ITERATIVE EVOLUTION

This is a continuation of co-pending application Ser. No. 07/908,712, filed on Jul. 2, 1992, now abandoned.

INCORPORATION BY REFERENCE

K. Sims, "Artificial Evolution For Computer Graphics," ACM Computer Graphics, Vol. 25, No. 4 (July, 1991), pp.319–328, incorporated herein by reference.

K. Sims, "Interactive Evolution of Dynamical Systems," included in Proceedings of the First European Conference On Artificial Life, Paris, France, Dec. 11–13, 1991, incorporated herein by reference.

K. Sims, "Interactive Evolution Of Equations For Procedural Models," Imagina '92 Proceedings, Monte-Carlo, January, 1992, pVII-21, incorporated herein by reference.

FIELD OF THE INVENTION

The invention relates generally to the field of digital computers, and more particularly relates to methods and systems for interactively generating objects.

BACKGROUND OF THE INVENTION

Computers are increasingly being used to generate and manipulate "objects" having high degrees of complexity. In computer graphics, for example, simulated structures, images, textures, designs, motions and the like are often considered "objects," or may be represented by corresponding "objects," which are generated and manipulated by the computer. Similarly, in computer generation of sounds for, for example, music, individual sounds, chords, and even sound progressions are often considered "objects," which are generated and manipulated by the computer. Generally, an "object" relates to a computer-generated element which may be generated and processed by the computer and through appropriate attachments to the computer, such as a video display or an audio device, may be visually or audibly displayed to and perceived by an operator using the computer.

An object may be represented in the computer by a "representation" which directs the computer in how the object is to be generated. Typically, representations of object are in the form of computer programs which embody procedural models which, when executed by a computer, essentially provide step-by-step instructions indicating how a particular object is to be created and manipulated. The methodology by which such programs are generated places a significant burden on a programmer or operator, since he or she must understand not only the image to be created, but also the details of the often complicated procedures that must be embodied in the program to enable the computer to generate the object. Small changes which may be required to modify an object in a particular way may require significant and time-consuming changes or additions to the procedures embodied in the program.

SUMMARY OF THE INVENTION

The invention provides a new and improved system which enables a computer to generate and manipulate objects.

In brief summary, in one aspect the invention provides a new computer object processing system that, during selected iterations, generates an object. The system comprises a seed object generator, an object mutation portion and an iteration control portion. The seed object generator generates a predetermined number of seed objects, each seed object defining an object for an initial iteration. The object mutation portion generates, during each iteration, a predetermined number of mutated objects (i) in response to a selected one of the seed objects during the initial iteration and (ii) in response to a selected object during each iteration after the initial iteration. The iteration control portion enables the seed object generator and the object mutation portion to operate through successive iterations and for facilitating selection during each of the iterations of one of the seed objects or one of the mutated objects for use by the object mutation portion in generating a mutated object during each iteration.

In another aspect, the invention provides a computer method for, during selected iterations, generating an object. During an initial iteration, a predetermined number of seed objects are generated, each seed object defining an object for the initial iteration. During each successive iteration, a predetermined number of mutated objects are generated (i) in response to a selected one of the seed objects during the initial iteration and (ii) in response to a selected object during each iteration after the initial iteration. During each iteration, one of the seed objects or one of the modified objects is selected for use in generating a mutated object during each iteration.

In yet another aspect, the invention provides a computer object processing system for, during selected iterations, generating an object. The system includes a digital data processor for generating object data in response to objects generated under control of a processing control portion. The processing control portion controls generation of objects by the processor, and includes a seed object generator portion, an object mutation portion and an iteration control portion. The seed object generator portion enables the processor to generate a predetermined number of seed objects. The object mutation portion enables the processor to generate, during each iteration, a predetermined number of mutated objects (i) in response to a selected one of the seed objects during the initial iteration and (ii) in response to a selected object during each iteration after the initial iteration. The iteration control portion controls the processor in response to each of the seed object generator portion and the object mutation portion to operate through successive iterations and for facilitating selection during each of the iterations of one of the seed objects or one of the mutated objects for use by the processor in generating a mutated object under control of the object mutation portion during each iteration.

In yet a further aspect, the invention provides a processing control portion for controlling generation of objects by a digital data processor. The processing control portion controls generation of objects by the processor, and includes a seed object generator portion, an object mutation portion and an iteration control portion. The seed object generator portion enables the processor to generate a predetermined number of seed objects. The object mutation portion enables the processor to generate, during each iteration, a predetermined number of mutated objects (i) in response to a selected one of the seed objects during the initial iteration and (ii) in response to a selected object during each iteration after the initial iteration. The iteration control portion controls the processor in response to each of the seed object generator portion and the object mutation portion to operate through successive iterations and for facilitating selection during each of the iterations of one of the seed objects or one of the mutated objects for use by the processor in generating a mutated object under control of the object mutation portion during each iteration.

In yet a further aspect, the invention provides a computer object processing system for, during selected iterations, generating an object comprising a plurality of object elements. The computer object processing system comprises a processor comprising a processor array including a plurality of processing elements each for generating object pixel data for a pixel assigned thereto, and a host processor for generating objects and for enabling the processing elements to use the objects to generate object data under control of a processing control portion. The processing control portion controls generation of objects by the processor, and comprises a seed object generator portion, an object mutation portion and an iteration control portion. The seed object generator portion enables the host processor to generate a predetermined number of seed objects. The object mutation portion enables the host processor to generate, during each iteration, a predetermined number of mutated objects (i) in response to a selected one of the seed objects during the initial iteration and (ii) in response to a selected object during each iteration after the initial iteration. The iteration control portion (a) controls the host processor in response to each of the seed object generator portion and the object mutation portion to operate through successive iterations, (b) facilitates selection during each of the iterations of one of the seed objects or one of the mutated objects for use by the host processor in generating a mutated object under control of the object mutation portion during each iteration, and (c) enables the host processor to, in turn, enable the processor array to generate object element data in response to the mutated object.

In yet another aspect, the invention provides a processing control portion for use in computer object processing system that, during selected iterations, generates objects comprising a plurality of object elements. The computer object processing system comprises a processor comprising a processor array including a plurality of processing elements each for generating object element data for an object element assigned thereto, and a host processor for generating objects and for enabling the processing elements to use the objects in under control of a processing control portion and for enabling the processing elements to generate the object element data. The processing control portion controls generation of object element data by the processor, and comprises a seed object generator portion, an object mutation portion and an iteration control portion. The seed object generator portion enables the host processor to generate a predetermined number of seed objects. The object mutation portion enables the host processor to generate, during each iteration, a predetermined number of mutated objects (i) in response to a selected one of the seed objects during the initial iteration and (ii) in response to a selected object during each iteration after the initial iteration. The iteration control portion (a) controls the host processor in response to each of the seed object generator portion and the object mutation portion to operate through successive iterations, (b) facilitates selection during each of the iterations of one of the seed objects or one of the mutated objects for use by the host processor in generating a mutated object under control of the object mutation portion during each iteration, and (c) enables the host processor to, in turn, enable the processor array to generate object element data in response to the mutated object.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
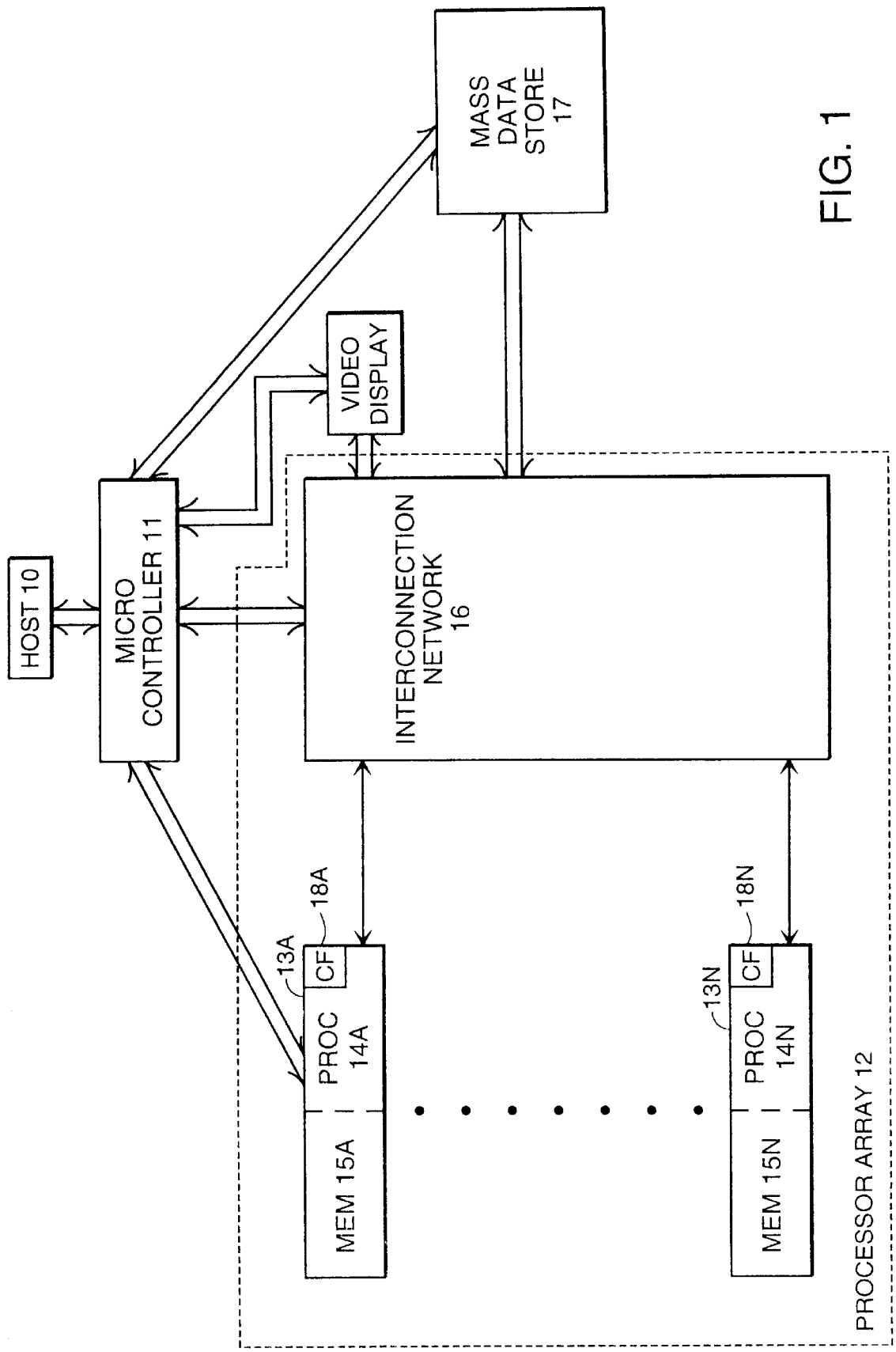
FIG. 1 is a general block diagram of a massively-parallel computer useful in one embodiment of a computer object processing system constructed in accordance with the invention.

The invention provides a new computer object processing system for generating and manipulating objects. In this connection, an object may comprise many things which may be generated by a computer. Generally, an "object" relates to a computer-generated element which may be generated and processed by the computer and through appropriate attachments to the computer, such as a video display or an audio device, may be visually or audibly displayed to and perceived by an operator using the computer. In this connection, objects may comprise for example, visual elements such as simulated structures, images, textures, designs, motions and the like, as well as sounds including, for example, music, individual sound elements, chords, and even sound progressions.

The computer object processing system will be described in connection with a system for generating and manipulating objects in the form of images. The computer object processing system represents each object by a symbolic representation, which in one embodiment is a lisp expression as described below in connection with FIG. 2. The system operates in accordance with an iterative technique of generating a plurality of mutated objects from a base object, with each of the mutated objects and the base object comprising an image. During the first iteration, symbolic representations for one or more original, or "seed," objects, which will be termed "seed symbolic expressions," are generated by the computer object processing system or provided by the operator. The computer object processing system may use the seed symbolic representations to generate respective images for display to an operator. The operator may select one or more of the displayed images, and the computer object processing system uses the symbolic representation corresponding to the selected image as a base which it uses to generate a plurality of mutated symbolic expression. Each mutated symbolic expression so generated constitutes a symbolic representation which represents a mutated object, in this case a mutated image. The operations are then repeated in connection with the mutated symbolic representations in a second iteration. That is, during the second iteration, the computer object processing system generates from the mutated symbolic representations further images which it displays to the operator. The operator may select an image, and the computer object processing system will generate from the symbolic representation for the selected image further mutated symbolic representations whose corresponding images may be generated, displayed and selected to initiate a subsequent iteration. These operations may be repeated through successive iterations, and may terminate when the operator takes some action therefor.

During each iteration, the operator may select the image whose symbolic representation is to be used as a base symbolic representation for the next iteration in accordance with any selection criteria, which may include, for example, whether the image appears to approach a goal image which the operator wishes to have produced, or to enable the operator to explore images which may previously have not been conceived or considered. It will be appreciated that the computer object processing system in accordance with the invention can generate quite complex images defined by symbolic expressions of substantial complexity, but without the operator having to generate the particular procedure or symbolic representation which the computer may need to produce the image directly.

The computer object processing system in one embodiment comprises a suitably-programmed massively-parallel computer which generates image data representing each of the base and mutated images [which are collectively and generally referred to as "images"]. FIG. 1 is a general block diagram depicting a massively-parallel computer useful in one embodiment of the computer object processing system. With reference to FIG. 1, the massively-parallel computer in one embodiment includes a host 10 which transmits commands to a micro-controller 11 to control processing by a processor array 12. The processor array 12 includes a plurality of processing elements 13A through 13N [generally identified by reference numeral 13(i)], each including a processor 14(i) and a memory 15(i).

The massively-parallel computer depicted in FIG. 1 operates generally in a "SIMD," or "single-instruction/multiple-data," manner. In SIMD, the micro-controller 11 transmits control signals that enable the processors 14(i) to, in parallel, process items of data in their respective memories 15(i). In one embodiment, the addresses of the locations in the memories 15(i) to be processed by the processors 14(i) can be selectively provided either by the micro-controller 11 or they may be generated and maintained locally at each of the processors 14(i). The control signals provided by the micro-controller can enable the processors 14(i) to use either the locally-generated addresses or addresses provided by it in identifying the locations containing data to be processed.

In addition, processing by particular ones of the processors 14(i) can be conditioned on results of previous processing. In particular, each processor 14(i) includes a context flag 18A through 18N [generally identified by reference numeral 18(i)] that the processor 14(i) can, when enabled by the micro-controller 11, set or clear in response to its processing. The micro-controller 11 can condition processing by each of the processors 14(i) in response to the condition of the respective context flag 18(i).

The processor array also includes an interconnection network 16 which, under control of the micro-controller 11, transfers data among the processing elements 13(i) and between the processing elements 13(i). Each processing element 13(i) is identified by an identifier, which also serves as an address in the interconnection network. When one processing element 13(I) needs to send data to another processing element 13(J), it does so in a message which identifies the recipient processing element 13(J).

The massively-parallel computer may also include a video display 20 which may, under control of the host 10 and/or micro-controller 11, be used to display video image data it receives from the processor array 12 over the interconnection network 16. Typically, a video display 20 displays an image in the form of an array of picture elements, or "pixels," with the video characteristics for each pixel, such as intensity and color being determined by pixel data. Generally, in generating pixel data for display by video display 20, each pixel is associated with one or more of the processing elements 13(i), which, under control of the host 10 and micro-controller 11, generate the pixel data which the video display uses to display the particular pixel.

One embodiment of the massively-parallel computer also includes a mass data store 17. In one embodiment, the mass data store 17 generally stores data from the processing elements 13(i) organized in rows. That is, the mass data store 17 stores, in a group of successive storage locations, an item from all processing elements 13(i), with successive groups storing differing items. In that embodiment, a unit of storage in the mass data store 17 effectively comprises a group of storage locations in the mass data store 17, organized so that the mass data store 17 transfers an integral number of items to the processing elements 13(i) in one transfer operation. It will be appreciated that the data in other embodiments of the mass data store 17 may be organized in a number of ways, and that a system in accordance with the invention may be implemented in a massively parallel computer which does not include a mass data store.

It will be appreciated that the number of physical processing elements in an actual massively-parallel computer will be fixed, which places a maximum on the number of data items which can be processed in parallel. However, in one embodiment the micro-controller 11 may effectively enable the physical processing elements to emulate a plurality of processing elements, termed "virtual processors," each represented by a data item. The micro-controller 11 enables the physical processing elements to, in parallel, serially perform each processing operation in connection with the data items associated with each virtual processor. Unless otherwise specified, "processing element 13(i)" will refer either to both a physical processing element and to a virtual processing element. In that embodiment, each virtual processor has an identifier which uniquely identifies it among other virtual processors; in one embodiment the virtual processor identifier has a high-order portion which corresponds to the identifier of the physical processing element which emulates the particular virtual processor, and a low order portion which identifies the virtual processor among the virtual processors emulated by the physical processing element.

In one embodiment, the new computer object processing system operates by generating and manipulating expressions, each comprising a symbolic representation of an object or image, which expressions are defined in the well-known "lisp" programming language. Before proceeding further, it would be helpful to describe a lisp expression and how one may be used to define an image. As noted above, an image is displayed in the form of an array of pixels, each having pixel data which defines the intensity or brightness of the pixel as displayed by the video display 20. For, for example, a two-dimensional image comprising a pixel array with the conventional Cartesian axes "x" and "y," the pixel data P(x,y) for a pixel at a point (x,y) in the image is generated by the computer object processing system as $$P(x,y) = \text{lisp\_expression}(x,y) \qquad [\text{Eqn. 1}]$$

which is the valuation of the lisp expression "lisp_expression" defining the image at the particular point (x,y). A lisp expression "lisp_expression" is a function of one or more arguments. A function may be any of the arithmetic functions such as addition, subtraction, multiplication, division, minimum, maximum, absolute value, the exponential or logarithmic function, any of the Boolean functions AND, OR, XOR, any of the trigonometric functions, or any special purpose functions which may be useful in connection with computer graphics or image processing. The arguments of a lisp expression may comprise a constant value, a variable or another lisp expression, and define the values to which the function is to be applied. A constant value may, in turn, comprise a scalar or a vector. A variable may be a variable in, for example, the particular location of the pixel along a dimension of the Cartesian axes. Variables also may take on a number of other forms, in some cases the forms may depend on the nature of the objects for which the expressions are symbolic representations. For example, for objects in the form of images, a variable may also comprise an image name, in which case the pixel data for an image associated with the particular image name may be manipulated in accordance with the expression.

In the lisp language, an expression comprising a function "$func_1$" of "N" arguments (where "N" is an integer) "$arg\_i_1$" (where "$i_1$" is an index from one to "N") is written $$(func_1 arg\_1_1 arg\_1_1 arg\_3_1 \ldots arg\_N_1) \quad [\text{Eqn. 2}],$$

where, as noted above, each argument "$arg\_i_1$" may be a constant value, a variable or another lisp expression. If, in the lisp expression in equation Eqn. 2, argument $arg\_2$, for example, is a lisp expression comprising a function $func_2$ of "M" arguments $arg\_i_2$, the equation Eqn. 2 may be written $$(func_1 arg\_1_1 (func_2 arg\_1_2 arg\_2_2 arg\_3_2 \ldots arg\_M_2) arg\_3_1 \ldots arg\_N_1) \quad [\text{Eqn. 3}].$$

Figure 2:
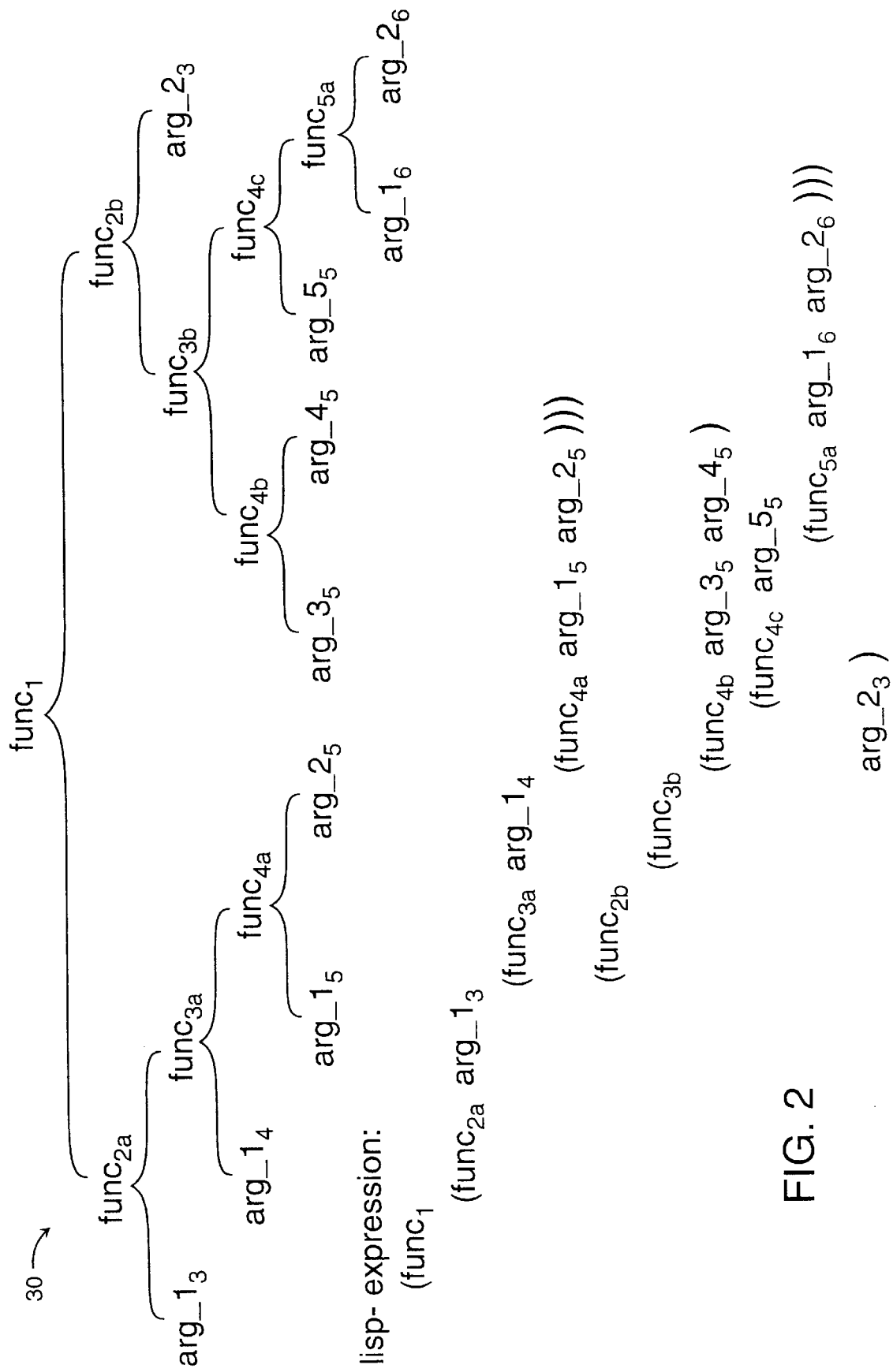
FIG. 2 is a diagram depicting several views of a "lisp expression" used in one embodiment of a computer object processing system constructed in accordance with the invention.

A lisp expression may be viewed as a tree structure, as shown in FIG. 2. FIG. 2 depicts a complicated lisp expression "lisp_expression" having the form:

$$(func_1(func_{2a}arg\_1_3(func_{3a}arg\_1_4 (func_{4a}arg\_1arg\_2_5)))$$
$$(func_{2b}(func_{3b}(func_{4b}arg\_3_5arg\_4_5) (func_{4c}arg\_5_5(func_{5a}arg\_1_6arg\_2_6)))arg\_2_3) \quad [\text{Eqn. 3}]$$

and its associated tree structure 30. As shown on FIG. 2, each item labeled "$func_{ij}$" and "$arg\_k_l$" (where "i," "j," "k," and "l" are indices) is termed a "node" in the tree structure, as well as a node in the lisp expression. In the tree structure 30, the function $func_1$ is identified as the root node, and it has "child" nodes $func_{2a}$ and $func_{2b}$. In addition, the root node $func_1$ is the "parent" node of each of the nodes $func_{2a}$ and $func_{2b}$. Nodes $func_{2a}$ and $func_{2b}$ themselves have child nodes $arg\_1_3$ and $func_{3a}$ (for node fund) and $func_{3b}$ and $arg\_2_3$ (for node $func_{2b}$), and nodes $func_{2a}$ and $func_{2b}$ are themselves parent nodes of their respective child nodes. Each node, except for "leaf" nodes representing the arguments $arg\_i_j$, will have one or more child nodes, and each node, except for the root node representing function $func_1$ will have one parent node. Each node, including the leaf nodes, is further the "relative root" of a "sub-tree" including itself and any nodes therebelow in the tree structure.

With this background, as described above the new computer object processing system mutates a base object to create a plurality of mutated objects by applying a plurality of mutation techniques to the expression comprising the symbolic representation of the base object, and in particularly selectively applying the mutation techniques to the respective nodes of the expression. For each mutated object to be produced, the computer object processing system generates a copy of the base lisp expression, symbolically representing the base object, and, beginning with the root node and progressing down the tree, may apply one of the mutation techniques to each node in the base lisp expression. In one particular embodiment, the computer object processing system employs a variety of mutation techniques, including:

1. The computer object processing system may generate an expression at random and substitute it for a node. With this mutation technique, the lisp expression is modified so that, in the tree structure for the lisp expression defining the object (FIG. 2, for example), for the node at which substitution is to occur, the sub-tree of which the node is a relative root is replaced by a new sub-tree for the randomly-generated expression.

2. If a node represents a scalar value, the computer object processing system may modify the value by a random amount.

3. If a node represents a vector, the computer object processing system may modify the value of each element of the vector by a random amount.

4. If a node represents a function, the computer object processing system may substitute a different function selected at random. The computer object processing system also adjusts the arguments so that the number of arguments for the new function is proper for the function. With this mutation technique, in the tree structure for the lisp expression defining the image, the node at which substitution is to occur is replaced with a node defining a new function. If the new function requires fewer arguments than the prior function, the computer object processing system eliminates at random one or more sub-trees of which the node's children are relative roots. On the other hand, of the new function requires additional arguments than the prior function, the computer object processing system adds one or more sub-trees representing the additional arguments, which it generates at random.

5. For a node which is a relative root of a sub-tree defining an expression, the computer object processing system may adjust the node so that the expression becomes the argument of a new function selected at random. If the new function requires additional arguments, the computer object processing system generates the additional arguments at random. In this technique, for the tree-structure for the expression defining the image, a sub-tree may be detached from the tree and replaced with a new expression, with the detached sub-tree becoming an argument to the new expression.

6. For a node representing a function, the computer object processing system may modify the lisp expression so that a sub-tree having as a relative root a child node representing an argument of the function may substitute the child node for the function node. In this technique, the computer object processing system eliminates the function node, and its parent node is connected directly to one of its child nodes in the tree structure.

7. The computer object processing system may modify the lisp expression so that node, along with any nodes in the sub-tree of which the node is a relative root, is replaced by a copy of a proximate sub-tree. In this technique, the sub-tree to be eliminated is removed from the tree and replaced by a copy of the proximate sub-tree.

In generating a mutated expression defining a mutated object, the computer object processing system applies these mutation techniques to the nodes of the expression for the base object at varying frequencies and with varying probabilities. Generally, in one particular embodiment, the probability that any particular node of an expression will be mutated is relatively low, so that differences between each mutated object and the object from which they are being mutated will likely not be huge from one iteration to the next. If a node is to be mutated, the frequencies with which each particular mutation technique is applied may vary with respect to the type of node to which a mutation technique is to be applied, as well as with respect to the particular mutation technique to be applied. These will permit an operator to generally slowly, through a series of iterations, sequence from an initial image toward a goal image, without large differences that can occur from one iteration to the next if a number of nodes of each expression are mutated during each iteration, while still ensuring that there are at least some differences between the selected image and the mutated images.

Figure 3:
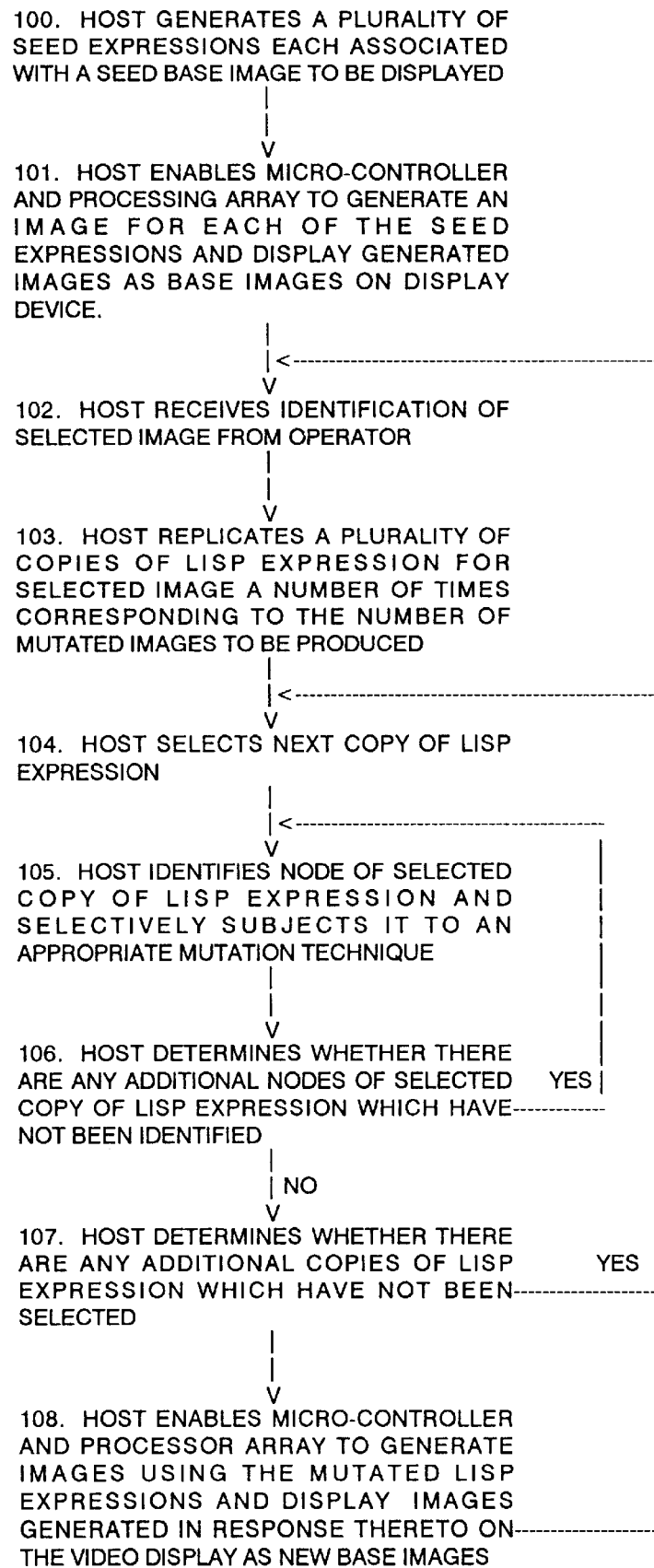
FIG. 3 is a flow chart depicting the operations of the massively-parallel computer depicted in FIG. 1 in connection with the computer object processing system.

With this background, the operations performed by the computer object processing system in connection with the generation and mutation of symbolic representations and their corresponding objects will be described in connection with the flow chart of FIG. 3. With reference to FIG. 3, the host 10 at the start of an image generation session generates a plurality of lisp expressions at random which will be used as initial, or seed, expressions (step 100), which comprise the symbolic representations of the objects to be mutated. The host 10 further enables the micro-controller 11 and processing array 12 to use the seed expressions to generate the objects, that is, the pixel data which are then displayed as seed images by the video display 20 (step 101). The number of lisp expressions generated in step 100 depends on the number of original images to be displayed, which may be selected by an operator. As described above, the seed expressions may actually be provided by the operator or by a program being processed by the host 10, instead of being specifically generated by the host 10. As further described above, each processing element 13(i) in the processor array 12 is associated with a particular pixel, having a particular location, in an image, and the host 10 enables the micro-controller 11 to, in turn, enable the processing elements 13(i) to generate the pixel data for the respective pixels in parallel, and thereafter transit the pixel data to the video display.

After the images for the seed expressions have been displayed, an operator may select one or more image to be used in subsequent processing. The operator may perform the selection by any appropriate indicating device, such as a conventional mouse (not shown) which may be used in conjunction with the video display 20 The host 10 receives the identification of the selected image (step 102) and begins performing the above-described mutation process in connection with the lisp expression from which the pixel data for the selected image was generated (step 103) to provide mutated lisp expressions from which the mutated images can be generated. The lisp expression from which the pixel data for the selected image was generated will be referenced as the "selected lisp expression." In the mutation operation, the host 10 makes a number of copies of the selected lisp expression, the number corresponding to the number, as selected by the operator, of mutated images to be produced (step 103).

The host 10 then selects one of the copies of the lisp expression produced in step 103 (step 104) and subjects each node of the selected copy to a possible mutation, that is, it iteratively identifies nodes to which it may apply an appropriate one of the mutation techniques to generate a mutated node (step 105). The host 10 determines whether to apply a mutation technique to the selected node using a probability determination which preferably provides that the probability that any particular node will be mutated will be in a relatively low range, with the proviso that, if the lisp expression is longer the probability will be at the low end of the range and if it is shorter the probability will be at the high end of the range. Increasing the probability that a node will be mutated if the lisp expression is relatively short will enhance the likelihood that at least one node of the lisp expression will be mutated. If the host 10 determines that, during a particular iteration, the identified node is to be mutated, it selects the mutation technique based on the type of node, including whether the node represents a function, a scalar value, a vector or a variable, and also based on the frequency selected for each of the mutation techniques.

After generating the mutated node, the host 10 determines whether all nodes of the selected lisp expression copy have been identified as being subject to a possible mutation (step 106). If not, the host 10 returns to step 105 to identify the next node and repeat the operation with respect to that node. At some point, the host 10 will determine in step 106 that it has identified all of the nodes of the selected expression copy (step 105), and will sequence to step 107. In that step, the host 10 will determine whether it has subjected to possible mutation all of the nodes of all of the lisp expression copies it created in step 103, and if not it returns to step 104 to select a next copy and repeats the operations described above in connection with steps 105 and 106 in connection therewith to select and mutate the nodes of that copy depending on the probability and frequency determinations with respect to each node and mutation technique.

It will be appreciated that, at some point the host 10 will determine in step 107 that it has subjected to possible mutation all of the nodes of all of the lisp expression copies it created in step 103, and will sequence to step 108. In that step, the host 10 enables the micro-controller 11 and processing array 12 to use the mutated lisp expressions to generate pixel data which are then displayed as mutated images by the video display 20 in the same manner as described above in connection with step 101. The host 10 then returns to step 102 to enable the operator to examine the displayed mutated images and select one whose lisp expression will be used in the same manner as described above in connection with steps 103 through 108.

The operator may enable the host 10 to repeat the operations described in steps 102 through 108 through any number of iterations to generate potentially more complex mutated images defined by generally more complex mutated lisp expressions. At some point, the operator may determine that a particular mutated image conforms to particular aesthetic or other criteria, and terminate the image generation session as described above in connection with FIG. 3. The operator may enable host 10 to save the mutated lisp expression used to generate this finally-selected mutated image for later processing. In addition, the host 10 may also facilitate the saving of particular mutated lisp expressions, as selected by the operator, generated during the image generation session for later use as a base for further mutations. This may, for example, provide the operator with the ability to explore a range of image mutations without having to start from the seed images generated in step 100.

The computer object processing system described above in connection with FIGS. 1 through 3 also provides some additional capabilities in connection with the symbolic representations which may be particularly useful in connection with a more complex mutated symbolic representation which an operator may enable to be saved as described above. Two illustrative capabilities involve use of two symbolic representations (which will be identified as "parent symbolic representations") from which the computer object processing system will generate one or more child symbolic representations, which have some characteristics of the parent symbolic representations.

For example, continuing with the symbolic representation in the form of a lisp expression, the computer object processing system may enable the generation of a number of child lisp expressions from two lisp expressions (which will be identified as "parent lisp expressions"). The child lisp expressions comprise copies of the original two parent lisp expressions, and in one embodiment an additional two lisp expressions generated by interchanging selected sub-trees between the original parent lisp expressions. This capability will be particularly useful in connection with parent lisp expressions having similarly-shaped tree structures, allowing interchange of sub-trees from corresponding portions of the tree structure. This mating operation tends to allow combining of similar expressions each of which has a desired aesthetic property.

In addition, instead of creating two child lisp expressions in which corresponding sub-trees are interchanged, the computer object processing system may generate a single child lisp expression in which a sub-tree represents an interpolation between the corresponding sub-trees of two parent lisp expressions. In this case, the computer object processing system may provide as the interpolated sub-tree an expression which has one or several fixed interpolation points between the sub-trees of the parent expressions. Alternatively, the computer object processing system may provide as the interpolated sub-tree an expression which facilitates a fractional variation of the contributions of each of the parent sub-trees, in which case the operator may view the range of images represented by the child lisp expression by varying the fraction provided by each.

It will be recognized that the mutated lisp expressions generated as described above may be of such complexity that an undesirable amount of time would be required to generate the pixel data for a mutated image. In that case, the computer object processing system, in particular the host 10, may maintain, for each of the various types of functions, an estimate of the amount of time required to execute the function, which the host 10 may use when mutating a node in step 105 (FIG. 3). In particular, the host 10 may, after mutating a particular node (step 105) by adding or changing a function, estimate the amount of time that may be needed to generate pixel data from the mutated lisp expression, and select whether to accept or reject the mutation depending on, for example, whether the estimate is beyond a selected threshold value. If the host selects to accept the mutation, it maintains the lisp expression as it was mutated in step 105, but if it selects to reject the mutation it returns the lisp expression to its condition prior to the mutation in step 105. The host 10 may thereafter proceed with step 106, or it may attempt a mutation with a different function or with a different mutation technique. By selectively accepting or rejecting particular mutations in this manner, the computer object processing system may ensure that the time required to generate the pixel data for the mutated images will remain below predetermined thresholds, and indeed may remain at speeds which a human operator may consider to be comfortable in an interactive session.

Similarly, the host 10, in performing a mutation operation in connection with a particular node of a lisp expression, may in some cases select a particular mutation to perform so as to simplify the lisp expression. This may be useful for a lisp expression, for example, when the estimate of the time required to generate the pixel data reaches a selected threshold. When that occurs, the host 10 may, for example,:

(i) when performing a mutation operation (step 105) in connection with a node representing a function, emphasize the sixth mutation technique described above, and also, in the fourth and seventh techniques, the substitution of functions having shorter estimated pixel data generation times for functions having longer such times, and (ii) when performing a mutation operation in connection with a node representing either a function, a constant value or a variable, de-emphasize the fifth technique, as use of that technique can increase complexity, and pixel data generation time, for the mutated lisp expression.

While the computer object processing system has been described in connection with generation of objects comprising two-dimensional images, it will be appreciated that the system may be used to generate objects comprising images or other elements of any number of dimensions by use of appropriate numbers of dimensional variables in the lisp expressions. If, for example, images are to be three-dimensional, the lisp expressions representing the images may have three variables, each associated with one of the three Cartesian axes of a three-dimensional system. As in a two-dimensional image described above, not all of the lisp expressions need have all three variables, but the images for those lisp expressions which have fewer than three variables will not vary along the particular dimension associated with the variables which are not present. For a three-dimensional image, each processing element 13(i) would be assigned to generate data, analogous to pixel data, for a "voxel," or volume element, and the host 10, after generating the lisp expressions enables the processing elements 13(i) to generate the voxel data in parallel in a manner similar to that described above.

In addition, the computer object processing system may generate time-varying objects by using time as a variable in the lisp expressions. The computer object processing system may further generate and mutate dynamical systems by use of representations such as lisp expressions which represent initial position, and the equations of motion, such as velocity (first time derivative) and so forth. After the expressions are mutated during each iteration, positions can be determined by conventional computer integration methods, such as Euler's method.

In addition, the computer object processing system may generate three-dimensional objects by using parametric variables in the lisp expressions which comprise their representations. The computer object processing system may further generate and mutate these three-dimensional objects by use of representations such as lisp expressions which represent parametric equations that describe three-dimensional shapes or surfaces.

Continuing with the illustrative example in which the generated objects comprise images, the computer object processing system described above generates complex images which may be used as, for example, textures in connection with, for example, particular edges or surfaces of two- or three-dimensional computer graphic structures. In that connection, the computer graphic structures may have edges or surfaces which are defined by particular equations in, for example, two or three variables, each variable being associated with one of the dimensions. For a two-dimensional structure, the host 10 can use the equations defining the edges of the structure to identify pixels which would be positioned within the edges and enable the processing elements 13(i) which generate the pixel data for such pixels to transmit the pixel data to the video display 20 for display. Similarly, for a three-dimensional structure, the host 10 can use the equations defining the surfaces of the structure to identify the surface or surfaces of the three-dimensional image generated as described above to be displayed, and enable the processing elements 13(i) which generate the image data to transmit it to the video display 20 for display.

While the computer object processing system has been described in connection with a massively-parallel computer which operates in a SIMD manner, it will be apparent to those skilled in the art that the system may be further implemented in a computer which operates in a MIMD (multiple instruction/multiple data) manner, in a computer which operates in a SPMD (single program/multiple data) manner, and also in a conventional serial computer.

Similarly, while the computer object processing system has been described as generating and mutating objects represented by expressions in the lisp language, it will be appreciated that it may also or instead generate and mutate expressions in other computer languages, indeed may be used to generate and mutate objects in forms other than expressions.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by letters patent of the United States is:

1. A computer object processing system comprising:
   A. seed object generator for generating a predetermined number of seed objects;
   B. an operator controlled object selection means for selecting;
      i. one of the seed objects during an initial iteration; and
      ii. one of a predetermined number of mutated objects during an iteration after the initial iteration;
   C. an object modifier portion for generating a predetermined number of mutated objects (i) in response to the selected one of the seed objects during an initial iteration and (ii) in response to the selected object during the iteration after the initial iteration; and
   D. an iteration control portion for controlling each of the seed object generator and the object modifier portion to operate through the iterations using the object selected by the operator as the selected object during a succeeding iteration.

2. A computer object processing system as defined in claim 1 in which each object is represented by an expression including a plurality of nodes, the nodes comprising a predetermined number of node types, the object modifier portion generating a mutated object by performing a mutation operation in connection with at least one selected node of the selected expression, the mutation operation representing a mutation of the selected node with the mutation being determined by the node type of the selected node.

3. A computer object processing system as defined in claim 2 in which each node type has assigned thereto a plurality of mutation types each defining a type of modification for a node of the particular node type, the object modifier portion when performing a mutation operation selecting a mutation type in response to the node type of the selected node.

4. A computer object processing system as defined in claim 3 in which at least some objects are represented by multiple-node expressions each having a plurality of nodes, and the object modifier portion selectively performs mutation operations in connection with the nodes of at least some multiple-node expressions, the object modifier portion during a mutation operation in connection with a node of a multiple-node expression selecting a particular mutation type from among the mutation types assigned to the node's node type in response to a predetermined selection frequency.

5. A computer method for, during selected iterations, generating an object the method comprising the steps of:
   A. generating a predetermined number of seed objects for an initial iteration;
   B. an operator selecting (i) a seed object during the initial iteration, or (ii) a mutated object during an iteration after the initial iteration; and
   C. generating a predetermined number of mutated objects (i) in response to the selected one of the seed objects during the initial iteration and (ii) in response to a selected object during an iteration after the initial iteration.

6. A method as defined in claim 5 in which each object is represented by an expression including a plurality of nodes, the nodes comprising a predetermined number of node types, the mutation generation step including the step of performing a mutation operation in connection with at least one selected node of the selected expression, the mutation operation representing a mutation of the selected node with the mutation being determined by the node type of the selected node.

7. A method as defined in claim 6 in which each node type has assigned thereto a plurality of mutation types each defining a type of modification for a node of the particular node type, the method including the step, when performing a mutation operation, of selecting a mutation type in response to the node type of the selected node.

8. A method as defined in claim 7 in which at least some objects are represented by multiple-node expressions each having a plurality of nodes, mutation operations being selectively performed in connection with the nodes of at least some multiple-node expressions, during a mutation operation in connection with a node of a multiple-node expression a particular mutation type being selected from among the mutation types assigned to the node's node type in response to a predetermined selection frequency.

9. A computer object processing system for, during selected iterations, generating an object, the computer object processing system comprising:
   A. a digital data processor for generating an object under control of a processing control portion;
   B. a processing control portion for controlling generation of an object by the processor, the processing control portion comprising:
      i. a seed object generator portion for controlling the data processor to generate a predetermined number of seed objects;
      ii. an operator controlled object selection portion for controlling the data processor to select
         a. one of the seed objects during an initial iteration; and
         b. one of a predetermined number of mutated objects during an iteration after the initial iteration;
      iii. an object mutation portion for controlling the processor to generate the predetermined number of mutated objects (i) in response to the selected one of the seed objects during the initial iteration and (ii) in response to a selected object during the iteration after the initial iteration; and
      iv. an iteration control portion for controlling the processor in response to each of the seed object generator portion and the object mutation portion to operate through the iterations using the object selected by the operator as the selected during a succeeding iteration.

10. A computer object processing system as defined in claim 9 in which each object is represented by an expression including a plurality of nodes, the nodes comprising a predetermined number of node types, the object mutation portion control said processor to generate a mutated object by performing a mutation operation in connection with at least one selected node of the selected expression, the mutation operation representing a mutation of the selected node with the mutation being determined by the node type of the selected node.

11. A computer object processing system as defined in claim 10 in which each node type has assigned thereto a plurality of mutation types each defining a type of modification for a node of the particular node type, the object modifier element controlling said processor, when performing a mutation operation, to select a mutation type in response to the node type of the selected node.

12. A computer object processing system as defined in claim 11 in which at least some objects are represented by multiple-node expressions each having a plurality of nodes, and the object modifier element controls said processor to selectively perform mutation operations in connection with the nodes of at least some multiple-node expressions, the object modifier element controlling said processor to, during a mutation operation in connection with a node of a multiple-node expression, select a particular mutation type from among the mutation types assigned to the node's node type in response to a predetermined selection frequency.

13. A processing control element for controlling generation of objects by a digital data processor in a computer object processing system, the processing control element enabling the processor to, during selected iterations, generate objects, the processing control element comprising:
   A. seed object generator portion for controlling the processor to generate a predetermined number of seed objects;
   B. an operator controlled object selection portion for controlling the data processor to select
      i. one of the seed objects during an initial iteration; and
      ii. one of a predetermined number of mutated objects during an iteration after the initial iteration;
   C. an object mutation portion for controlling the processor to generate a predetermined number of mutated objects (i) in response to the selected one of the seed objects during the initial iteration and (ii) in response to the selected object during the iteration after the initial iteration; and
   D. an iteration control portion for controlling the processor in response to each of the seed object generator portion and the object mutation portion to operate through the iterations using the object selected by the operator as the selected object during a succeeding iteration.

14. A processing control element as defined in claim 13 in which each object is represented by an expression including a plurality of nodes, the nodes comprising a predetermined number of node types, the object mutation portion controlling said processor to generate a mutated object by performing a mutation operation in connection with at least one selected node of the selected expression, the mutation operation representing a mutation of the selected node with the mutation being determined by the node type of the selected node.

15. A processing control element as defined in claim 14 in which each node type has assigned thereto a plurality of mutation types each defining a type of modification for a node of the particular node type, the object modifier element controlling said processor, when performing a mutation operation, to select a mutation type in response to the node type of the selected node.

16. A processing control element as defined in claim 15 in which at least some objects are represented by multiple-node expressions each having a plurality of nodes, and the object modifier element controls said processor to selectively perform mutation operations in connection with the nodes of at least some multiple-node expressions, the object modifier element controlling said processor to, during a mutation operation in connection with a node of a multiple-node expression, select a particular mutation type from among the mutation types assigned to the node's node type in response to a predetermined selection frequency.

17. A computer object processing system for, during selected iterations, generating an object defining a plurality of object elements, the computer object processing system, comprising:
   A. a processor comprising:
      i. a processor array including a plurality of processing elements each for generating object element data for an object element assigned thereto;
      ii. a host processor for generating objects and for enabling the processing elements to use the object to generate the object element data under control of a processing control portion;
   B. a processing control portion for controlling generation of objects and object element data by the processor, the processing control portion comprising:
      i. a seed object generator portion for controlling the host processor to generate a predetermined number of seed objects,
      ii. an operator controlled object selection portion for controlling the processor to select:
         a. one of the seed object during an initial iteration; and
         b. one of a predetermined number of mutated objects during an iteration after the initial iteration;
      iii. an object mutation portion for controlling the host processor to enable the processor array to generate the predetermined number of mutated objects (i) in response to a selected one of the seed objects during an initial iteration and (ii) in response to a selected object during the iteration after the initial iteration; and
      iv. an iteration control portion for controlling the host processor in response to each of the seed object generator portion and the object mutation portion to operate through the iterations using the object selected by the operator as the selected object during a succeeding iteration.

18. A computer object processing system as defined in claim 17 in which each object is represented by an expression including a plurality of nodes, the nodes comprising a predetermined number of node types, the object mutation portion controlling said host processor to generate a mutated object by performing a mutation operation in connection with at least one selected node of the selected expression, the mutation operation representing a mutation of the selected node with the mutation being determined by the node type of the selected node.

19. A computer object processing system as defined in claim 18 in which each node type has assigned thereto a plurality of mutation types each defining a type of modification for a node of the particular node type, the object modifier element controlling said host processor, when performing a mutation operation, to select a mutation type in response to the node type of the selected node.

20. A computer object processing system as defined in claim 19 in which at least some objects are represented by multiple-node expressions each having a plurality of nodes, and the object modifier element controls said host processor to selectively perform mutation operations in connection with the nodes of at least some multiple-node expressions, the object modifier element controlling said host processor to, during a mutation operation in connection with a node of a multiple-node expression, select a particular mutation type from among the mutation types assigned to the node's node type in response to a predetermined selection frequency.

21. A processing control element for use in a computer object processing system which, during selected iterations, generates an object comprising a plurality of object elements, the computer object processing system comprising a processor comprising a processor array including a plurality of processing elements each for generating object element data for an object element assigned thereto and a host processor for generating objects and for enabling the processing elements to generate the object element data all under control of the processing control portion, the processing control element comprising:

A. a seed object generator portion for controlling the host processor to generate a predetermined number of seed objects, B. an operator controlled object selection portion for controlling the host processor to select:
  i. one of the seed objects during an initial iteration; and
  ii. one of a predetermined number of mutated objects during an iteration after the initial iteration;

C. an object mutation portion for controlling the host processor to enable the processor array to generate a predetermined number of mutated objects (i) in response to a selected one of the seed objects during an initial iteration and (ii) in response to a selected object during the iteration after the initial iteration; and D. an iteration control portion for controlling the host processor in response to each of the seed object generator portion and the object mutation portion to operate through the iterations using the object selected by th operator as the selected object during succeeding iteration.

22. A processing control element as defined in claim 21 in which each object is represented by an expression including a plurality of nodes, the nodes comprising a predetermined number of node types, the object mutation portion controlling said host processor to generate a mutated object by performing a mutation operation in connection with at least one selected node of the selected expression, the mutation operation representing a mutation of the selected node with the mutation being determined by the node type of the selected node.

23. A processing control element as defined in claim 22 in which each node type has assigned thereto a plurality of mutation types each defining a type of modification for a node of the particular node type, the object modifier element controlling said host processor, when performing a mutation operation, to select a mutation type in response to the node type of the selected node.

24. A processing control element as defined in claim 23 in which at least some objects are represented by multiple-node expressions each having a plurality of nodes, and the object modifier element controls said host processor to selectively perform mutation operations in connection with the nodes of at least some multiple-node expressions, the object modifier element controlling said host processor to, during a mutation operation in connection with a node of a multiple-node expression, select a particular mutation type from among the mutation types assigned to the node's node type in response to a predetermined selection frequency.

* * * * *